United States Patent

[11] 3,618,784

[72] Inventors Walter W. Hellmuth
Beacon;
Raymond C. Schlight, Fishkill, both of N.Y.
[21] Appl. No. 789,737
[22] Filed Jan. 8, 1969
[45] Patented Nov. 9, 1971
[73] Assignee Texaco Inc.
New York, N.Y.

[54] RUST-INHIBITING OIL FILTER ELEMENT
17 Claims, 2 Drawing Figs.
[52] U.S. Cl. .................................................. 210/493, 210/501
[51] Int. Cl. .................................................. B01d 39/00
[50] Field of Search ............................................ 210/59, 60, 70, 198, 483, 220, 484, 501, 493

[56] References Cited
UNITED STATES PATENTS
1,442,773  1/1923  Richmond et al. ............. 210/501 X
2,366,190  1/1945  Hurn ............................. 210/59 X
2,785,805  3/1957  Hough .......................... 210/501 X
3,224,592  12/1965  Burns et al. .................... 210/501 X Primary Examiner—John Adee
Attorneys—K. E. Kavanagh and Thomas H. Whaley ABSTRACT: An oil filter suitable for use in the lubricating oil system of an internal combustion engine, the oil filter element of which has an adherent oxygenated boron derivative. The oxygenated boron derivative can be boric acid and/or any of its dehydration products, salts or esters.

The methods of dispersing the oxygenated boron derivative in the oil filter element include (1) accelerating the oxygenated boron derivative toward the oil filter element by maintaining a pressure differential across the oil filter element; (2) sandwiching the oxygenated boron derivative between two layers of oil filter element material; (3) making a solution of the oxygenated boron derivative in a liquid vehicle, soaking the oil filter material with the solution and volatilizing the liquid vehicle from the oil filter element.

PATENTED NOV 9 1971 3,618,784

RUST-INHIBITING OIL FILTER ELEMENT

BACKGROUND OF THE INVENTION

The working parts of four-stroke cycle internal combustion engines require protection with lubricating oil during operation. The lubricating oils may or may not have additives therein which act specifically to prevent oil deterioration and engine corrosion, for example, ashless dispersants, ash-containing detergents and miscellaneous additives of the type normally employed to prevent corrosion and oxidative decomposition of both the fluid and the internal metal parts.

Rust is formed on the ferrous parts of an internal combustion engine due to the gradual buildup of moisture and acidic contaminants in the lubricating oil in the crankcase which are derived from the combustion process. In the past, specific additives have been blended into lubricating oils to prevent rust formation on the internal engine parts due to these contaminants. A particular example of a class of lubricating oil additives which act to prevent engine rust formation is the borates. However, due to the insolubility of borates in oil they must be added in an oil-soluble form such as for example, a metal polyborate-carbonate overbased metal sulfonate derived from a generally oil-soluble sulfonic acid, or as a stabilized dispersion such as a boric acid reacted alkenyl succinimide or as an oil soluble ester or complex of boric acid. These types of materials generally suffer from a lack of hydrolytic stability, and in general the above systems require very specific additive combinations to formulate a lubricating oil to the precise level of desired engine rust protection without concomitant deterioration of other desirable performance properties, such as fluid oxidation stability, antisludging tendencies, and detergency characteristics. In this disclosure, the term lubricating oil includes a wide variety of hydrocarbon lubricating oils such as napthenic base, paraffinic base and mixed base mineral oils. In addition, hydrocarbon lubricating oils derived from coal products and synthetic hydrocarbon oils, e.g., alkylene polymers such as polypropylene and polyisobutylene of a molecular weight of between about 250 and 2,500 are also contemplated. Also, any of the well-known additives placed in fully formulated oils are also included as part of the lubricating oil.

SUMMARY OF THE INVENTION

It is an object of the present invention to inhibit the amount of rust formation which takes place on the moving parts of an internal combustion engine in contact with lubricating oil from its crankcase.

It is another object of the present invention to add a rust formation inhibitor to the lubricating oil of an internal combustion engine as it flows through the filter.

It is a further object of the invention to add a borate compound directly to the lubricating oil protecting an internal combustion engine, to prevent rust formation on the ferrous parts in contact with the lubricating oil.

Other objects and advantages of this invention will be apparent from a consideration of the following detailed description and examples in conjunction with the annexed drawing.

In accordance with the present invention, there is described an oil filter element containing an oxygenated boron derivative. There is also described an oil filter element suitable for use in the lubricating oil system of an internal combustion engine, the oil filter comprises a closed housing having at least one inlet port and an outlet port, an oil filter element in the housing disposed between the inlet port and the outlet port, and an oxygenated boron derivative dispersed through the oil filter element whereby polar materials present in lubricating oil passed through the oil filter element will leach oxygenated boron derivative to provide a rust inhibitor in the lubricating oil. A method as also described in accordance with the present invention, of making an oil filter element capable of introducing a rust inhibitor into an oil circulated therethrough, which comprises selecting an oxygenated boron derivative and dispersing said oxygenated boron derivative in said oil filter element.

DESCRIPTION OF THE PREFERRED EMBODIMENTS

Figure 1:
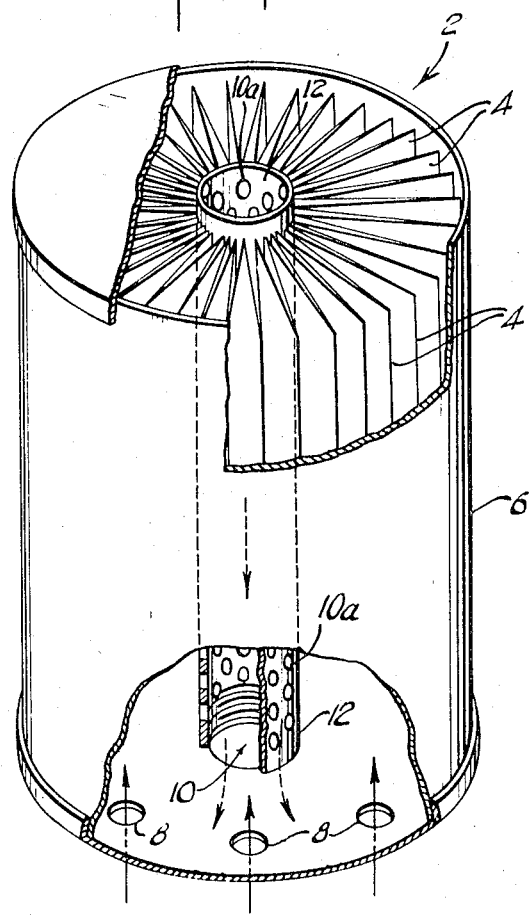
FIG. 1 is a perspective, partially in section, illustrating a lubricating oil filter for an internal combustion engine.
Figure 2:
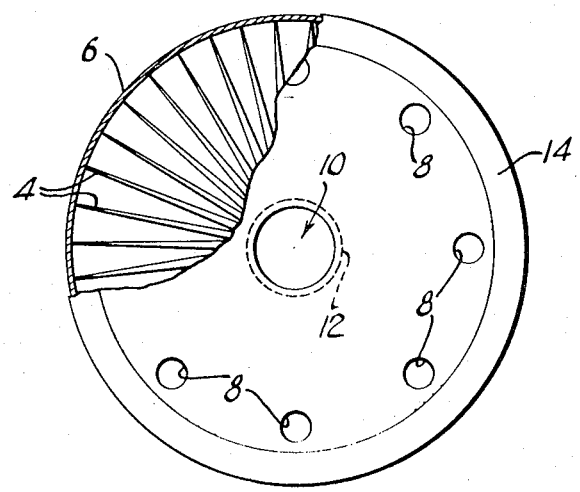
FIG. 2 is a bottom plan view, partly in section of the lubricating oil filter of FIG. 1.

An oil filter 2 of the canister type for use with a four-stroke cycle internal combustion engine is generally shown in the drawing although other lubricating oil filters such as the cartridge type can be used in the practice of this invention. An oil filter element 4 of the pleated-paper type (shown as an example since the invention encompasses all types of oil filter elements and is not limited to the pleated-paper type) is enclosed in a chambered housing 6 having a plurality of inlet ports 8 in the base of the chambered housing 6. The chambered housing also has an outlet port 10, which is in communication with the chamber in housing 6 through an apertured conduit 12 having apertures 10a therein, which extends the length of the oil filter 2. A short section of the apertured conduit 12 adjacent the outlet port 10, is threaded to mate with an externally threaded pipe (not shown) extending from the internal combustion engine and communicating with the crankcase.

In operation, the apertured conduit 12 is screwed on to the externally threaded pipe and is maintained at a lower pressure than that existing at the inlet ports 8. The lubricating oil in the internal combustion engine is thus forced into the inlet ports 8 and out the outlet port 10 by the pressure differential. In the oil filter 2 the lubricating oil passes through the oil filter element 4 where foreign particles are removed from the lubricating oil. The filtered lubricating oil then flows through the apertures 10a into the apertured conduit 12 where it is guided toward the outlet port 10.

The oil filter element 4 is fabricated from a permeable material such as paper, cotton, cloth, and silk. An annular gasket 14 fits flat on the bottom of the oil filter 2, having the same outside diameter as the housing 6. The gasket 14 provides a seal between the oil filter 2 and the internal combustion engine (not shown) to prevent the loss of lubricating oil as it passes therebetween.

It has been found that rust can be inhibited from forming on the ferrous parts of an internal combustion engine by passing lubricating oil through an oil filter element 4 having dispersed therethrough an oxygenated boron derivative.

Hereinbefore and hereinafter the term "oxygenated boron derivative" denotes boric acid and/or any of its dehydration products, salts, or esters. Further the word "dispersed" denotes coating, impregnating, and sandwiching the boron-containing compound in the oil filter element 4.

While the exact mechanism by which oxygenated boron derivatives operate in the oil filter unit is not understood, the following is offered as a possible explanation of the mechanics involved.

Boric acid and/or any of its dehydration products, salts or esters are generally insoluble in lubricating oil, but they are soluble in a polarized liquid such as water or many of the additives blended into a fully formulated lubricating oil. However, in the absence of water in the lubricating oil in the crankcase of an internal combustion engine, rusting of the ferrous parts of the internal combustion engine will not take place so long as the lubricating oil leaves a thin film of protection on these ferrous parts. But, as soon as the internal combustion engine is put into operation, water and other products of combustion condense on the colder cylinder walls. These materials find their way into the lubricating oil in the crankcase. By a similar process, gaseous mixtures generated during the power stroke of the internal combustion engine, bypass the piston rings and condense in the crankcase thus contaminating the lubricating oil therein. The water and combustion products which contaminate the lubricating oil system provide the necessary ingredients in contact with the ferrous parts of the internal combustion engine, for rusting of the ferrous parts to take place.

During operation of the internal combustion engine, the lubricating oil therein is continually being passed through the oil filter 2. Any liquid polar components present in the lubricating oil system will thus pass through the oil filter element 4 and come into contact with the oxygenated boron derivative dispersed in the oil filter element 4. The polar components thus leach out a very small part of the oxygenated boron derivative into solution in the lubricating oil and act to prevent any chemical or catalytic action by these materials when they come into contact with any of the ferrous parts of the internal combustion engine.

The oil filter element 4 is prepared by obtaining a commercial oil filter 2, for example, a Texaco T-1 filter. A pressure differential is then maintained across opposite surfaces of the oil filter element by either maintaining a vacuum, for example, of 5 p.s.i., at the outlet port 10 of the oil filter 2 or by increasing the pressure for example to 20 p.s.i., at at least one of the inlet ports 8. An oxygenated boron derivative is then made available at the zone of higher pressure adjacent the oil filter element 4. This can be easily done by inverting the oil filter 2 and heaping an oxygenated boron derivative powder over the inlet ports 8. Because of the pressure differential maintained, the oxygenated boron derivative powder is accelerated toward the oil filter element 4. However, as the powder contacts the oil filter element, it is abruptly decelerated and dispersed throughout the oil filter element 4.

Another method of dispersing an oxygenated boron derivative throughout an oil filter element 4 during production of the oil filter element 4 is as follows. A first sheet of permeable material from which the oil filter element is to be fabricated for example, paper, cotton, cloth, and silk is laid substantially flat on a substantially horizontal surface. The oxygenated boron derivative is poured substantially across the surface of the permeable material. A second sheet of the permeable material from which the filter element is fabricated is then laid substantially flat over the oxygenated boron derivative so that it forms a sandwich of the oxygenated boron derivative between the two layers of permeable material. The edges of the first and second sheets are then sealed together to retain the oxygenated boron derivative therebetween. The sandwiched first and second sheets are then formed into a predetermined geometric shape which is suitable for the oil filters.

A further method which can be used when manufacturing an oil filter, to disperse an oxygenated boron derivative throughout the oil filter element 4 involves pouring a predetermined amount of a liquid vehicle, in which the oxygenated boron derivative is soluble, into a container. A predetermined amount of the oxygenated boron derivative is then added to the liquid vehicle in the container to form a solution. For example, a 2 percent solution by weight of boric acid in warm water is prepared. A permeable material from which the oil filter element 4 is to be fabricated, is then immersed into the solution and left in the solution for a sufficient amount of time to absorb some of the solution into the fibers of the permeable material. The permeable material is then removed from the solution and the liquid vehicle is volatilized and allowed to escape from the permeable material. The permeable material is then formed into a predetermined geometric shape which is suitable for the oil filter.

EXAMPLE I

This example illustrates that a substantial amount of an oxygenated boron derivative was incorporated into a lubricating oil as the lubricating oil was passed through an oil filter having dispersed therein an oxygenated boron derivative of the present invention.

The filter paper was placed across the bottom of a Buchner funnel and 25 grams of powdered boric acid admixed with 75 grams of diatomaceous earth, were spread substantially evenly across the filter paper. Twelve hundred grams of a fully formulated lubricating oil containing zinc dialkyl dithiophosphate corrosion inhibitor, and ethylene oxide reacted olefin-$P_2S_5$ reaction product, polymethacrylate viscosity index improver, and calcium carbonate overbased calcium sulfonate of total base No. 280 was poured over the admixture and collected at the bottom of the filter. The collected lubricating oil was repeatedly passed through the filter and collected over again. The pouring and collecting procedure was repeated for a total of 25 passes. The boron content of the oil was quantitatively analyzed after every succeeding fifth pass and the results obtained are as follows:

TABLE I

| Pass Number | Boron content of the Oil Weight % |
|---|---|
| 0 | 0.000 |
| 5 | 0.020 |
| 10 | 0.032–recheck 0.035 |
| 15 | 0.045 |
| 20 | 0.053–recheck 0.051 |
| 25 | 0.130–recheck 0.130 |

As can be seen from the above-tabulated test results, the boron content in the oil increased in proportion to the higher number of passes through the filter paper. Although the conditions were substantially anhydrous, additives present in the fully formulated lubricating oil are principally polar materials which assisted in incorporating 30 to 40 percent of the oxygenated boron derivative into the lubricating oil. This example shows that oxygenated boron derivatives can be added to lubricating oil with polar materials present when lubricating oils are passed through an oil filter element with oxygenated boron derivatives dispersed therein.

EXAMPLE II

This example illustrates similar results to example I, when using a commercial oil filter for an internal combustion engine.

A fully formulated lubricating oil containing a complement of additives consisting of a zinc dialkyl dithiophosphate corrosion inhibitor, an ethylene oxide reacted olefin-$P_2S_5$ derived dispersant, a barium carbonate overbased barium alkyl phenate detergent, a barium carbonate overbased barium alkyl sulfonate detergent and a polymethacrylate viscosity index modifier, was then passed through a commercial oil filter element for an internal combustion engine. The oil filter used was a Texaco T-1 filter having a paper-type filter element therein.

To disperse the oxygenated boron derivative into the oil filter element, 20 grams of boric acid powder was aspirated into the filter by maintaining a vacuum at the outlet port of the oil filter. Fifteen hundred grams of the lubricating oil was then passed through the filter and collected each time for 40 consecutive passes.

Three quantitative analyses were performed on the lubricating oil to determine the boron content of the lubricating oil. The first was before being passed through the filter, and the second and third were after 20 and 40 passes through the filter, respectively. The results are shown below.

TABLE II

| Number of Passes in the lubricating Oil | Percent by Weight of Boron |
|---|---|
| 0 | 0.000 |
| 20 | 0.012 |
| 40 | 0.011 |

Table II shows that the polar additives in the lubricating oil were able to leach approximately 5 percent of the normally insoluble oxygenated boron derivative from the oil filter element into the lubricating oil system.

EXAMPLE III

This example illustrates the superior anticorrosion properties imparted to the lubricating oil system from an oxygenated boron derivative of the present invention dispersed in a commercial filter element.

The same lubricating oil and Texaco T-1 oil filter where used as was used in example II. The oil filter element contained 32.2 grams of powdered boric acid. The method of introducing the boric acid into the filter was similar to the method used in example II.

The test selected for this example is the Ford Rust Test which comprises lubricating a 1966 Ford 289 CID V-8 engine. The engine is run under the following test conditions:

TABLE III

| Description | Value |
| --- | --- |
| Duration, hours | 47 |
| Speed, r.p.m. | 1500 |
| Load, b. hp. | 28 |
| Fuel pressure, p.s.i. | 4.5 |
| Fuel/Air ratio | 0.085 |
| Crankcase ventilation | Vented to atmosphere |
| Engine Part | Temperature °F. |
| Jacket out | 90 |
| Oil Gallery | 110 |
| Rocker Arm Covers | 60 |
| Intake Air | 110 |

At the end of the 47 hour period, the various engine parts are inspected, namely, the external and internal sections of the valve lifters. A rating of between zero and 10 is assigned. A rating of 10 represents no rusting and a rating of zero indicates heavy rusting of the entire surface.

TABLE IV

| Engine Part | Lubricating Oil with $H_3BO_3$ Dispersed Filter | Lubricating Oil Without $H_3BO_3$ dispersed Filter | |
| --- | --- | --- | --- |
| | | Sample 1 | Sample 2 |
| External Lifter | 8.2 | 7.1 | 7.5 |
| Internal Lifter | 5.9 | 4.4 | 4.9 |

As can be seen from table IV, the engine test made with an oil filter element having dispersed therein the oxygenated boron derivative of the invention, supplies substantially greater rust-preventing properties to the lubricant formulation than the engine tests made without the oxygenated boron derivative oil filter element.

The following examples IV and VI demonstrate how to disperse a dehydration product of boric acid, a salt of boric acid and an ester of boric acid into the oil filter element.

EXAMPLE IV

The following shows a method of dispersing a dehydration product of boric acid into a commercial oil filter element similar to that used in examples II and III.

A suspension of 20 grams of metaboric acid in 500 ml. of hexane is drawn into a canister-type oil filter element and the solvent drained by placing a vacuum at the outlet of the oil filter. The residual solvent is then removed by heating the filtration unit for 5 minutes at 225° F. under a reduced atmosphere. The filter element is then ready for use.

EXAMPLE V

The following shows a method of dispersing a salt of boric acid into a commercial oil filter similar to that used in examples II and III.

A mixture of 20 grams of $CaB_2O_4$ and 20 grams of cotton linters are spread onto a first sheet of filter paper. A second sheet of filter paper is placed over the mixture and the ends of the first and second filter papers are sealed together. The resultant sandwich is then folded into a pleated oil filter element and placed into an oil filter of the canister or cartridge type.

EXAMPLE VI

The following shows a method of dispersing an ester of boric acid in an oil filter element similar to that used in examples II and III.

To a solution of 62.4 grams (0.5 moles) of triethanolamine borate in 500 ml. warm acetonitrile is added an equal weight of diatomaceous earth filter material. The solvent, acetonitrile is then removed by a volatilization under heat and vacuum and the remaining mixture of solids impregnated with amine borate ester, is then ground to a powdery consistency.

Forty grams of the powdery mixture is then introduced into an oil filter element as described in the examples above, either by incorporating it as part of the filtration medium or in addition to the filtration medium of the pleated paper or fabric type.

Other modifications and variations of the above invention as hereinbefore set forth may be made without departing from the spirit and scope thereof, therefore, only such limitations should be expressed as are indicated in the appended claims.

We claim:

1. An oil filter suitable for use in the lubricating oil system of an internal combustion engine, said oil filter comprising a closed housing having at least one inlet port and an outlet port, an oil filter element in said housing disposed between said inlet port and said outlet port, and an oxygenated boron derivative dispersed through said oil filter element whereby polar materials present in lubricating oil passed through said oil filter element will leach oxygenated boron derivative to provide a rust inhibitor in said lubricating oil.

2. An oil filter as described in claim 1, wherein the oxygenated boron derivative is boric acid.

3. An oil filter as described in claim 1, wherein the oxygenated boron derivative is a dehydration product of boric acid.

4. An oil filter as described in claim 1, wherein the oxygenated boron derivative is a salt of boric acid.

5. An oil filter as described in claim 1, wherein the oxygenated boron derivative is an ester of boric acid.

6. An oil filter as described in claim 1, wherein the oxygenated boron derivative is a mixture of two or more of the oxygenated boron derivatives of boric acid, a dehydration product of boric acid, a salt of boric acid and an ester of boric acid.

7. An oil filter as described in claim 1, wherein the oxygenated boron derivative is selected from the group consisting of boric acid, a dehydration product of boric acid a salt of boric acid, and an ester of boric acid.

8. An oil filter element in accordance with claim 1, wherein the percent by weight of said boron dispersed through said oil filter element is between 0.001 percent and 1.000 percent of said lubricating oil to be cycled and recycled through said filter.

9. An oil filter element in accordance with claim 1, wherein said oil filter element is fabricated from a permeable material.

10. An oil filter element in accordance with claim 9, wherein said permeable material is paper.

11. An oil filter element in accordance with claim 10, wherein said paper is pleated.

12. An oil filter element in accordance with claim 9, wherein said permeable material is cotton.

13. An oil filter element in accordance with claim 9, wherein said permeable material is cloth.

14. An oil filter element in accordance with claim 9, wherein said permeable material is silk.

15. An oil filter element in accordance with claim 9, wherein said oxygenated boron derivative is dispersed throughout the external surface of said oil filter element.

16. An oil filter element in accordance with claim 9, wherein said oxygenated boron derivative is sandwiched between at least two layers of said permeable material.

17. An oil filter element in accordance with claim 9, wherein said oxygenated boron derivative is dispersed throughout the volume of said oil filter element.

* * * * *